United States Patent [19]

Dammann et al.

[11] 4,362,359
[45] Dec. 7, 1982

[54] COUPLING DEVICE FOR COUPLING SIGNALS INTO AND OUT OF A TRANSMISSION GLASS-FIBER

[75] Inventors: Hans Dammann, Tangstedt; Ulrich Killat, Hamburg, both of Fed. Rep. of Germany

[73] Assignee: U.S. Philips Corporation, New York, N.Y.

[21] Appl. No.: 141,858

[22] Filed: Apr. 21, 1980

[30] Foreign Application Priority Data

Apr. 21, 1979 [DE] Fed. Rep. of Germany ....... 2916234

[51] Int. Cl.$^3$ .............................................. G02B 5/172
[52] U.S. Cl. ................... 350/96.19; 350/96.15; 350/96.18; 350/162 R
[58] Field of Search ............... 350/96.19, 96.16, 96.18, 350/162 R

[56] References Cited

U.S. PATENT DOCUMENTS

| | | | |
|---|---|---|---|
| 4,057,326 | 11/1977 | Knop | 350/162 R |
| 4,111,524 | 9/1978 | Tomlinson | 350/96.19 |
| 4,198,117 | 4/1980 | Kobayashi | 350/96.19 |
| 4,257,673 | 3/1981 | Matthijsse | 350/162 R |

FOREIGN PATENT DOCUMENTS

| | | | |
|---|---|---|---|
| 54-102136 | 8/1979 | Japan | 350/96.19 |
| 54-146644 | 11/1979 | Japan | 350/96.19 |

OTHER PUBLICATIONS

"Bidirectional Coupler for Full Duplex Transmission on a Single Optical Fiber," G. Bickel et al., SPIE vol. 139, Guided Wave Optical Systems and Devices (1978), pp. 63-69.

*Primary Examiner*—John D. Lee
*Assistant Examiner*—Frank Gonzalez
*Attorney, Agent, or Firm*—Marc D. Schechter

[57] ABSTRACT

A device for coupling a first optical signal of a first wavelength into a transmission glass-fiber and for coupling a second optical signal, which has a second wavelength which differs from the first wavelength, out of the fiber. The two signals travel in the transmission glass-fiber in opposite directions. The optical signals also travel in other, spatially separated glass fibers. The device includes an imaging device arranged between the transmission glass-fiber and the other glass fibers. In the pupil of the imaging device, a binary optical grating is disposed. Other glass fibers receive the second optical signals which have been diffracted into the diffractions orders of the grating.

The grating is a phase grating and is arranged on an optical axis of the imaging device. It has a duty factor of at least substantially 1:1 as well as an optical path difference, $H=(n-1)h$, which is substantially $$(N-1)h = n_1\lambda_I, \text{ where } n_1 = 1, 2, 3, \ldots$$

and $$(N-1)h = (m_1 + \tfrac{1}{2})\lambda_k \text{ where } m_1 = 0, 1, 2, \ldots \text{ and } k = II, III, \ldots$$

2 Claims, 4 Drawing Figures

COUPLING DEVICE FOR COUPLING SIGNALS INTO AND OUT OF A TRANSMISSION GLASS-FIBER

BACKGROUND OF THE INVENTION

The invention relates to a device for coupling a first optical signal of a first wavelength into a transmission glass-fiber and for coupling a second optical signal, which travels in the transmission glass-fiber in a direction opposite that of the first optical signal, out of the fiber. The second signal has a second wavelength which differs from the first wavelength. The optical signals, to be coupled in and out of the fiber, are coupled to and from other glass fibers which are spatially separated. The device comprises an imaging device arranged between the transmission glass-fiber and the other glass fibers. A binary optical grating is situated in the pupil of the imaging device. The second optical signal is diffracted into the diffraction orders of the grating where it is received by the other fibers.

In the simplest case, information or data is transmitted between two stations or terminals, E1 and E2, by means of the transmission glass-fibers. An example of this is a telephone terminal and an associated exchange. To more effectively and economically use the capacity of the transmission glass-fibers, it is advantageous if only one transmission glass-fiber is needed for transmission in both directions. For each subscriber (terminals E1 and E2) this presents the problem of coupling optical signals of a first wavelength (transmitted signals) into the transmission glass-fiber and coupling optical signals of a second wavelength, which differs from the first wavelength (received signals), out of the transmission glass-fiber.

Such devices are already known from an article by G. Bickel et al entitled "Bidirectional Coupler for Full Duplex Transmission On a Single Optical Fiber" (SPIE Volume 139 Guided Wave Optical Systems and Devices (1978), pages 63-69). In, for example, FIG. 2, the optical signals are diffracted at different angles, by a diffraction grating, according to the wavelengths of the signals.

In this way a geometrical separation of the optical signals to be coupled into or out of the transmission glass-fiber can be obtained. The separated signals are transmitted by other glass fibers to which either a transmitter or a detector is coupled.

However, because of the reflection grating used, the optical signals travelling through the device are subject to comparatively high losses as a result of reflection and dispersion. In addition, the device has no common optical axis, which leads to construction and alignment problems.

SUMMARY OF THE INVENTION

Therefore, it is an object of the invention to provide a device of the aforementioned type in which the losses are minimized and in which there is only one optical axis.

Starting from a device as described above, these objects are achieved in that the grating is a phase grating and it is arranged on an optical axis of the imaging device. The phase grating has a duty factor (transmission ratio) of substantially 1:1 and has an optical path difference $H=(n-1)h$ which is at least substantially equal to $n_1 \lambda_I$ in which $n_1 = 1, 2, 3, \ldots$, where N is the refractive index of the phase grating material, h the grating height, and $\lambda_I$ is the wavelength of the optical signal to be coupled into the transmission glass-fiber. In addition, the optical path difference of the grating at least substantially complies with the requirement that $$(N-1)h = (m_1 + \tfrac{1}{2})\lambda_k \text{ where } m_1 = 0, 1, 2, \ldots \text{ and } k = II, III, \ldots$$

In the device according to the invention, the optical path difference H, of the transparent phase grating, is chosen to ensure that a transmitted signal of a first wavelength $\lambda_I$, which issues from a glass fiber (transmitting fiber) which is disposed on the optical axis on one side of the device, is coupled into a transmission glass-fiber situated on the optical axis on the other side of the device, without the transmitted signal being influenced by the phase grating.

However, an optical signal of a second wavelength, $\lambda_{II}$, to be coupled out of the transmission glass-fiber and travelling in a direction opposite that of the first optical signal, is influenced by the phase grating in such a way that it is diffracted into +1st and −1st diffraction orders. The radiation which has been diffracted into the two grating orders is then coupled into other glass fibers (receiving fibers) and it is applied to a common detector.

The phase grating itself is of the binary type and has a duty factor substantially (transmission ratio) 1:1. Such a phase grating has only two different grating heights (i.e. it is a meander-shaped phase grating). In the case of a duty factor of 1:1 such structures have the same planar dimension within one grating period. Therefore, such a phase grating can be manufactured very simply.

If the phase grating substantially complies with the requirement $$(N-1)h = (m_1 + \tfrac{1}{2})\lambda_k \text{ where } m_1 = 0, 1, 2, \ldots \text{ and } k = II, III, \ldots,$$

then the optical signal of the wavelength $\lambda_{II}$, to be coupled out of the transmission glass fiber, is diffracted in the +1st and −1st diffraction orders with maximum intensity. The detector, to which the signals which have been diffracted into the two orders are applied, thus produces a maximum detector output signal. The diffraction of radiation of a different wavelength, for example $\lambda_{III}, \lambda_{IV}$, into the +1st and −1st diffraction orders can be optimized in a similar way if this requirement is met.

In a further advantageous embodiment of the invention the phase grating is located between two lenses which are arranged on the optical axis of the transmission fiber. The lenses may take the form of selfoc (trademark) lenses. Selfoc lenses are cylindrical lenses whose optical axis is the cylinder axis. They have a radial refractive-index profile such that a light point, situated on the optical axis and at the entrance surface of the Selfoc lens, will leave the Selfoc lens, which for this purpose has a specific length, as a parallel radiation beam. By means of such lenses devices according to the invention can be constructed in a particularly compact and stable manner.

In a further advantageous embodiment of the invention the phase grating is formed in one of the facing surfaces of the Selfoc lenses, so that the separate manufacture of a phase grating and its alignment between the Selfoc lenses may be dispensed with. The phase grating can, for example, be formed by means of photolithographic techniques in combination with wet chemical etching or with reactive sputtering.

In the case of reactive sputtering, the glass or quartz surface portions exposed during the photolithographic process are removed by a reaction with a substance which forms a volatile compound. The resulting structure has very sharp edges.

DESCRIPTION OF THE PREFERRED EMBODIMENTS

Figure 1:
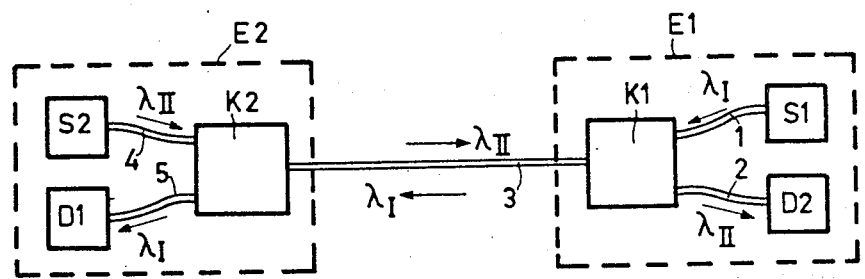
FIG. 1 schematically represents information transmission paths for operation with two wavelengths of light.

FIG. 1 schematically represents an information transmission path, for operation with two wavelengths of light, between two terminals E1 and E2, for example one telephone terminal and one associated exchange. The terminal E1 comprises an optical transmitter S1, which transmits optical signals having a wavelength $\lambda_I$, a detector D2 for receiving optical signals of a wavelength $\lambda_{II}$, as well as a device K1 which via glass fibers 1 and 2 is respectively connected to the transmitter S1 and the detector D2. The device K1, which is further connected to the transmission glass-fiber 3 which connects the terminals E1 and E2, serves to couple the transmitted signals of the wavelength $\lambda_I$ into the transmission glass-fiber 3 and at the same time to couple the signals of the wavelength $\lambda_{II}$ out of the transmission glass-fiber 3. These signals travel in the transmission glass-fiber 3 in an opposite directions. Wavelength $\lambda_{II}$ is transmitted by the transmitter S2 of the terminal E2, and wavelength $\lambda_I$ is received by the detector D2.

The device K2 in the terminal E2, however, serves to couple signals of the wavelength $\lambda_{II}$, which have been transmitted over a glass fiber 4 by a transmitter S2, into the transmission glass-fiber 3, while it couples signals of the wavelength $\lambda_I$ out of the transmission glass-fiber 3 and applies them to the detector D1 via a glass fiber 5.

The two terminals E1 and E2 are thus interconnected by a single transmission glass-fiber 3 only, in which optical signals of different wavelengths $\lambda_I$ and $\lambda_{II}$ travel in opposite directions. In this way the capacity of the transmission glass-fiber 3 is used more effectively, so that such an information transmission path can be used in a more economical manner.

Figure 2:
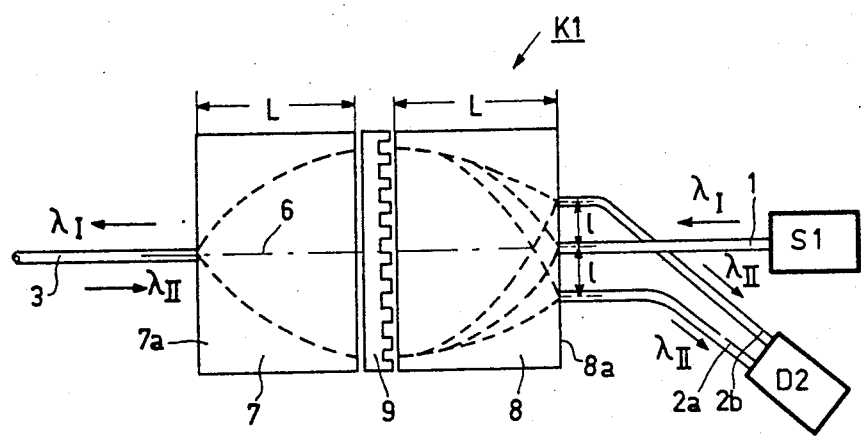
FIG. 2 represents a device for coupling optical signals into or out of a transmission glass-fiber.

FIG. 2 shows an example of the device K1 of the terminals E1 in more detail. It comprises two cylindrical Selfoc lenses 7 and 8 which have a length L and are disposed on a common optical axis 6. Between lenses 7 and 8 is a phase grating 9. The transmission glass-fiber 3 (FIG. 1) is positioned perpendicularly on the outer surface 7a of the Selfoc lens 7. The contact surface of the fiber 3 with the Selfoc lens 7 is concentric with the optical axis 6. In this way the lenses 7 and 8 and fiber 3 are positioned on a single optical axis. The transmission glass-fiber 3 is rigidly connected to the Selfoc lens 6, for example by cement.

A transmitting fiber 1 and two receiving fibers 2a and 2b, which connect the detector D2 and the Selfoc lens 8, are positioned perpendicularly on the outer surface 8a of the Selfoc lens 8. The contact surface of the transmitting fiber 1 with the Selfoc lens 8 is again concentric with the optical axis 6, while the receiving fibers 2a and 2b are situated at a distance 1, to be specified hereinafter, from the optical axis 6 and receive the radiation of the wavelength $\lambda_{II}$ which has been diffracted into the $\pm$1st diffraction orders by the phase grating 9. The receiving fibers 2a and 2b are also rigidly connected to the Selfoc lens 8, for example by cement.

The Selfoc lenses 7 and 8 have a length L such that they convert a point light sources, formed on the outer surfaces 8a and 7a by the glass fibers 1 and 3, into parallel rays. Without the phase grating 9 the glass fibers 1 and 3 would be imaged onto each other in a 1:1 ratio.

The optical path difference $H_1$ of the phase grating 9 of the terminal E1 is now selected so that it is an integral multiple of the wavelength $\lambda_I$ of the optical signals transmitted by the transmitter $S_1$. Thus, the optical path difference $H_1$ will be:

$$H_1 = (N_1-1)h_1 = n_1\lambda_I, \text{ where } n_1 = 1, 2, 3, \ldots \quad (1)$$

Figure 4:
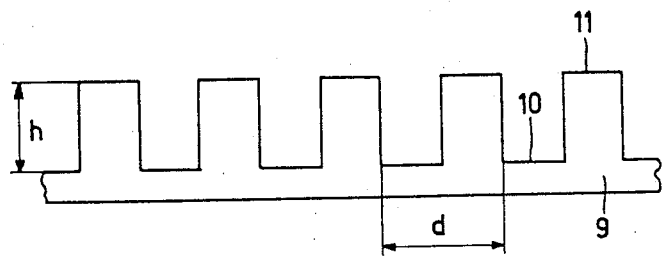
FIG. 4 represents a binary phase grating with a duty factor of 1:1.

In this equation $N_1$ is the refractive index of the material used for the phase grating 9, while $h_1$ is the grating height (h in FIG. 4). The phase grating 9, does not affect the signal carried by the wavelength $\lambda_I$ of the chosen height $H_1$. The optical signal from the transmitter S1 is thus coupled into the transmission glass-fiber 3 without any substantial radiation losses. Cross-talk between the transmitting and receiving fibers 1 and 2a and 2b i.e. a transmission of signals of the wavelength $\lambda_I$ in the receiving fibers 2a and 2b is minimal.

However, a fraction $\eta_1$ of the radiation of the wavelength $\lambda_{II}$, which arrives via the transmission glass-fiber 3 and which has for example been transmitted by the transmitter S2, is coupled into the receiving fibers 2a and 2b if the distance 1, from the center of the receiving fibers 2a and 2b to the optical axis 6, is equal to the spacing of the 0th and the $\pm$1st diffraction orders of the phase grating 9, i.e. when:

$$1 = f/d_1 \cdot \lambda_{II} \quad (2)$$

In this equation f is the focal length of the Selfoc lens 8 and $d_1$ is the grating period (d in FIG. 4), of the phase grating 9 in the terminal E1.

The fraction $\eta_1$ is found to be $$\eta = \frac{8}{\pi^2} \sin^2\left(\frac{\pi h_1(N_1 - 1)}{\lambda_{II}}\right) \quad (3)$$

in which $\eta_1$ reaches its maximum value of 81% if the requirement $$(N_1-1)h_1 = (m_1 + \tfrac{1}{2})\lambda_{II}, \text{ in which } m_1 = 0, 1, 2, \ldots, \quad (4)$$

is at least substantially met. Preferably, the equations (1) and (4) should be satisfied with small values of $n_1$ and $m_1$, so that the manufacture of the phase grating 9 is not complicated by excessive optical path differences $H_1$.

In the present embodiment, the Selfoc lenses 7 and 8 (Selfoc lenses type SSSL from Nippon Sheet Glass Co. Ltd.) and the Selfoc lenses disposed in the two terminals E1 and E2 (FIG. 1) have a length of L=7.85 mm, a diameter of 2 mm and a focal length of f=3.2 mm. The glass fibers 1 through 5, however, have an external diameter of 100 μm.

In the terminal E1 the optical transmitter S1 consists of a light-emitting diode which emits radiation of a wavelength $\lambda_I = 825$ nm. A suitable phase grating 9 in the terminal E1 has a grating height $h_1$ of 3.0 μm at a grating period of, for example $d_1 = 20$ μm. The maximum value $d_1$ may be chosen such that the transmitting and receiving fibers 1, 2a and 2b just contact each other. The fraction $\eta_1$ of the radiation of the wavelength $\lambda_{II}$ coupled into the detector $D_2$ is then 78%.

The optical transmitter S2 to be arranged in the terminals E2 comprises a light-emitting diode which emits radiation of a wavelength $\lambda_{II} = 1060$ nm. In the terminal E2 the phase grating with an optical path difference of $$H_2 = (N_2 - 1)h_2 = n_2\lambda_I, \text{ where } n_2 = 1, 2, 3, \ldots \quad (5)$$

has a grating height $h_2$ of 3.86 μm for a grating period $d_2$ of also 20 μm. The fraction $$\eta_2 = \frac{8}{\pi^2} \sin^2\left(\frac{\pi h_2(N_2 - 1)}{\lambda_I}\right) \quad (6)$$

of the radiation of the wavelength $\lambda_I$ coupled into the detector D1 is approximately 77%. The maximum value of 81% would be obtained for $$(N_2 - 1)h_2 = (m_2 + \tfrac{1}{2})\lambda_I, \text{ where } m_2 = 0, 1, 2, \ldots \quad (7)$$

Both phase gratings in the terminals E1 and E2 consist of a material with a refractive index $N = N_1 = N_2$, which is 1.45.

The distances between the optical axis 6 and the centers of the receiving fibers (for example the receiving fibers 2a and 2b in FIG. 2) in the two terminals E1 and E2, however, are different (equation 4) when the two phase gratings have equal grating periods ($d_1 = d_2$). Equal values of l can be obtained by a suitable choice of the grating periods $d_1$ and $d_2$ of the phase gratings.

Combining equations 1, 4, 5 and 7 yields the expression:

$$\frac{\lambda_1}{\lambda_2} = \frac{m_1 + x_1}{n_1} = \frac{n_2}{m_2 + x_2} \quad (8)$$

In this equation $x_1$ and $x_2$ result from equation 4 or 7 and $x_1$ and $x_2 \approx 0.5$.

Figure 3:
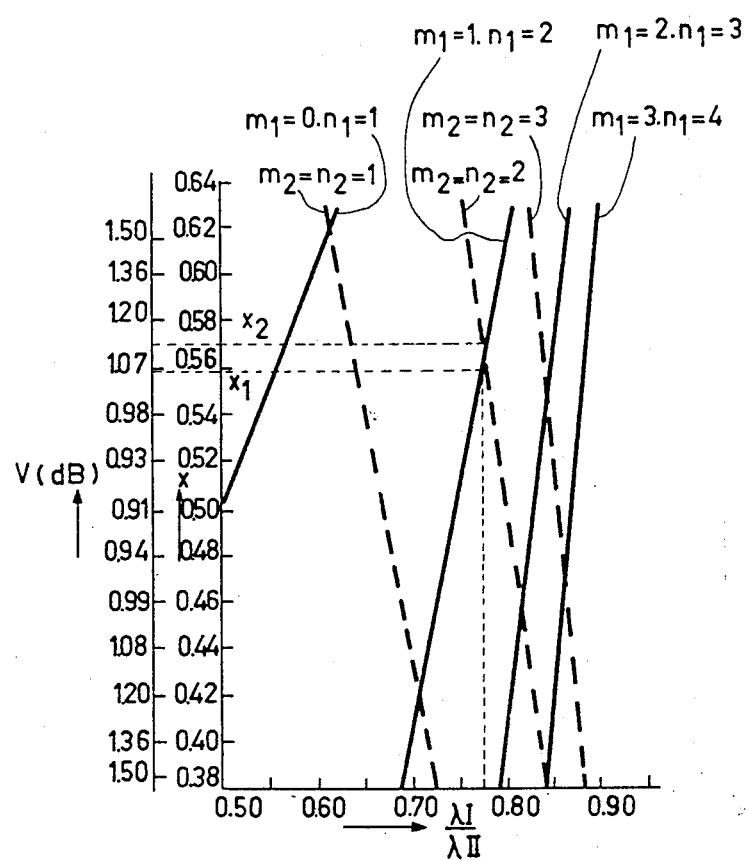
FIG. 3 graphically represents the coupling losses as a function of the quotient $\lambda_I/\lambda_{II}$.

FIG. 3 is a graphic representation of $x = x_1$ or $x_2$ depending on $(m_1 + x)/n_1$ (continuous line) and on $n_2/(m_2 + x)$ (dashed lines) for different values of m and n. Taking into account equation 8, the quotient $\lambda_I/\lambda_{II}$ may then be plotted on the abscissa. For the preselected value of $\lambda_I/\lambda_{II}$ the values of $n_1$, $m_1$, $x_1$ and $n_2$, $m_2$, $x_2$ may then be derived from this diagram. In the present embodiment, a quotient $\lambda_I/\lambda_{II} \approx 0.78$ is obtained for $\lambda_I = 825$ nm and $\lambda_{II} = 1060$ nm. A straight line (dotted) which extends from this point on the abscissa intersects the lines $m_2 = n_2 = 2$ and $m_1 = 1$, $n_1 = 2$. Starting from these intersections and horizontal lines (dotted), intersections with the ordinate are obtained at different values of $x_1$, $x_2$. These values may be read directly on the second ordinate as losses V in dB, which occur when the relevant radiation is coupled into the receiving fibers. When light sources of other wavelengths are selected, other values for $m_1$, $n_1$, $x_1$ and $m_2$, $n_2$, $x_2$ and thus other losses $V_1$, $V_2$ will be obtained in a similar way.

FIG. 4 is a cross-sectional view of the binary transparent phase grating 9 of FIG. 2. It has a rectangular grating profile with a duty factor of 1:1, i.e. a grating period d which is one-half grating dales 10 and one-half grating hills 11. It may, for example, take the form of a PVC foil grating (see Knop, Optics Comm., Vol. 18, 298 (1976)) or it may be etched into one of the facing inner surfaces of the Selfoc lenses 7 or 8 by means of photolithographic techniques.

The aligned coupling devices K1 and K2 with the Selfoc lenses and the phase grating may be moulded in epoxy resin or another suitable bonding agent to a block having four outgoing glass fibers 1, 2a, 2b and 3 (see FIG. 2), or 3, 4, 5a and 5b (not shown separately), so that a mechanically stable device is obtained which cannot become misaligned. The ends of the relevant outgoing glass fibers are then provided with suitable connectors, so that the devices $K_1$ and $K_2$ can be easily interconnected and connected to the associated transmitters $S_1$ and $S_2$ and detectors $D_1$ and $D_2$.

Furthermore, the Selfoc lenses may alternately be replaced by other lenses or lens systems, by means of which the optical signals emitted from the transmission glass-fiber 3 are imaged onto the receiving fibers 2a and 2b, or the transmitted signal leaving the transmitting fiber 1 is imaged onto the transmission glass-fiber 3. The radiation should be substantially perpendicular to the phase grating 9 as it passes therethrough. The glass fibers should then be positioned, accordingly, by other suitable means. The phase grating may, for example, by arranged in the pupil of a biconvex lens or between two biconvex lenses.

What is claimed is:

1. An optical wavelength-division multiplexing and demultiplexing device comprising:

first and second imaging devices, each of which can convert a point light source into parallel rays and can convert parallel rays into a point light source; and an optical grating situated between the imaging devices such that parallel rays, produced by the imaging devices from point light sources, will pass through the grating;

CHARACTERIZED IN THAT:

the grating is a binary transparent phase grating with a rectangular groove profile, said grating having a duty factor of 1:1;

the grating has an optical path difference, $H = (n-1)h$, which is substantially given by $H = n_1\lambda_I$, and $H = (m_1 + \tfrac{1}{2})\lambda k$ where $n_1$ and $m_1$ are positive integers, N is the refractive index of the grating material, h is the grating height and $\lambda_I$ and $\lambda_k$ are two optical wavelengths to be multiplexed and demultiplexed; and the device further comprises a transmission optical fiber having an end located to one side of the grating at a point where light exitting the fiber will be converted, by one of the imaging devices, into parallel rays substantially perpendicular to the grating, light beams of the two optical wavelengths to be multiplexed being simultaneously passed through the optical fiber in opposite directions.

2. An optical transmission system comprising two multiplexing and demultiplexing devices as claimed in claim 1, CHARACTERIZED IN THAT:

the phase grating in one device has an optical path difference, $H_1 = (N_1 - 1)h_1$, which is substantially given by $H_1 = n_1 \lambda_J$, and
$H_1 = (m_1 + \frac{1}{2})\lambda_K$; and the phase grating in the other device has an optical path difference, $H_2 = (N_2 - 1)h_2$, which is substantially given by $H_2 = n_2 \lambda_k$, and $H_2 = (m_2 + \frac{1}{2})\lambda_J$, where $n_1$, $n_2$, $m_1$ and $m_2$ are positive integers, $N_1$ and $N_2$ are the refractive indices of the gratings, and $h_1$ and $h_2$ are the heights of the gratings.

* * * * *